US007657398B2

(12) United States Patent
Beier

(10) Patent No.: US 7,657,398 B2
(45) Date of Patent: Feb. 2, 2010

(54) METHOD FOR DETECTING AN ERROR IN A MEASUREMENT CYCLE

(75) Inventor: Dominic Beier, Guetersloh (DE)

(73) Assignee: Miele & Cie. KG, Guetersloh (DE)

( * ) Notice: Subject to any disclaimer, the term of this patent is extended or adjusted under 35 U.S.C. 154(b) by 157 days.

(21) Appl. No.: 11/942,088

(22) Filed: Nov. 19, 2007

(65) Prior Publication Data
US 2008/0120066 A1    May 22, 2008

(30) Foreign Application Priority Data
Nov. 22, 2006    (DE)    ........................ 10 2006 055 420

(51) Int. Cl.
*G06F 19/00*    (2006.01)
(52) U.S. Cl. ................................... 702/182
(58) Field of Classification Search ......... 702/182–185, 702/188
See application file for complete search history.

(56) References Cited
U.S. PATENT DOCUMENTS
2003/0164713 A1    9/2003    Dollinger et al.

2006/0219705 A1    10/2006    Beier et al.
2008/0272934 A1*    11/2008    Wang et al. ............ 340/870.11

FOREIGN PATENT DOCUMENTS
| DE | 10010846 A1 | 9/2001 |
| DE | 10248698 | 4/2004 |
| DE | 102005015028 | 10/2006 |

* cited by examiner

*Primary Examiner*—Edward Raymond
(74) *Attorney, Agent, or Firm*—Darby and Darby

(57) ABSTRACT

A method of detecting an error in a measurement cycle. The method includes wirelessly transmitting a sequence of electrical signals sweeping through a predetermined frequency band from a transmitter to the receiver of an electric evaluation circuit of household appliance controller. The levels of the signals are measured, and a parameter is calculated from the signal levels in the evaluation circuit. The parameter is compared to an upper and lower limit, and the quality of the measurement cycle is determined as a function of the comparison.

19 Claims, 3 Drawing Sheets

METHOD FOR DETECTING AN ERROR IN A MEASUREMENT CYCLE

CROSS REFERENCE TO RELATED APPLICATIONS

Priority is claimed to German patent application DE 10 2006 055 420.5, filed Nov. 22, 2006, and which is hereby incorporated by reference herein.

FIELD OF THE INVENTION

The present invention relates to a method for detecting an error in a measurement cycle during which a sequence of electrical signals is wirelessly transmitted from a transmitter to a receiver of an electric evaluation circuit of a household appliance controller as the system sweeps through a predetermined frequency band.

BACKGROUND

In order to measure, for example, a temperature of a food load in a baking oven and to relay it to a household appliance controller, DE 10 2005 015 028 describes the use of high-frequency electromagnetic waves to excite surface wave devices incorporated in a temperature measuring probe so as to infer the food temperature indirectly from the electromagnetic waves returned from the surface wave devices. In the process, high-frequency electrical signals are generated in the household appliance controller and transmitted as electromagnetic waves via a transmitting antenna toward the temperature measuring probe. The waves returned from the temperature measuring probe are received by the transmitting antenna, which is at the same time a receiving antenna, and passed to an evaluation circuit. In order to infer the food temperature from the received electrical signals, the system sweeps through a predetermined frequency band each time a temperature measurement is made, i.e., each time a measurement cycle is performed. Electrical signals of different frequencies within the band of frequencies are successively generated in the household appliance controller, transmitted as electromagnetic waves to the temperature measuring probe, and the electromagnetic waves returned therefrom are in turn converted to electrical signals. The food temperature is then determined indirectly from the highest signal level of the then available electrical signals and the transmit frequency associated therewith, which is the resonant frequency.

The quality of the electromagnetic waves returned from the temperature measuring probe and of the electrical signals that are generated therefrom in the evaluation circuit depends strongly on the coupling characteristics between the temperature measuring probe and the household appliance controller. Such coupling characteristics include, for example, constantly changing ambient conditions, in particular in a treatment chamber in the form of a cooking chamber, and the orientation of the temperature measuring probe, i.e., of its antenna, with respect to the receiving antenna of the household appliance controller. During the measurement cycle, an error may occur depending on these or other possible coupling characteristics. For example, the levels of the electrical signals received by the household appliance controller may be too high or too low. In such cases, the food temperature can no longer be reliably determined with the desired accuracy.

A method for automatically adapting a signal level between an input and an output of an electrical circuit is described in DE 102 48 698 A1. However, this method relates only to individual electrical signals, and not to a measurement cycle.

SUMMARY

Therefore, an aspect of the present invention is to provide a method which allows automatic detection of errors of the above-mentioned type in a measurement cycle so as to thereby determine the quality of a measurement cycle.

In an embodiment, the invention provides a method of detecting an error in a measurement cycle. The method includes wirelessly transmitting a sequence of electrical signals sweeping through a predetermined frequency band from a transmitter to the receiver of an electric evaluation circuit of household appliance controller. The levels of the signals are measured, and a parameter is calculated from the signal levels in the evaluation circuit. The parameter is compared to an upper and lower limit, and the quality of the measurement cycle is determined as a function of the comparison.

BRIEF DESCRIPTION OF THE DRAWINGS

The present invention is described in the following with respect to exemplary embodiments and drawings, in which.

DETAILED DESCRIPTION

Figure 1:
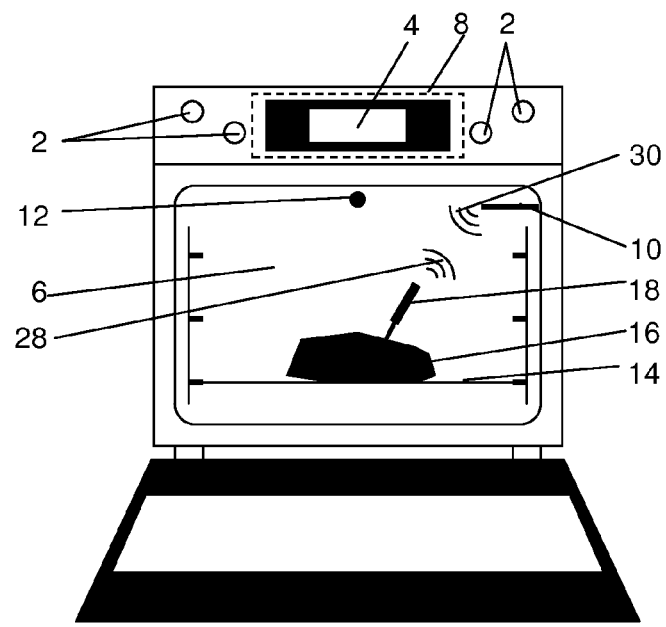
FIG. 1 is a schematic view of a household appliance in which the method of the present invention is used.

The present invention provides the automatic detection of an error in a measurement cycle.

In accordance with an embodiment of the present invention, a sequence of electrical signals is wirelessly transmitted from a transmitter to a receiver of an electric evaluation circuit of a household appliance controller as the system sweeps through a predetermined frequency band.

In an embodiment of the present invention, the integrated or cumulative value is calculated from the signal levels as the parameter. Thus, the method of the present invention is implemented in a particularly simple manner.

In an alternative embodiment, the parameter is calculated from a pair of values from the signal levels and the associated transmit frequencies as follows: determining the highest signal level and the associated resonant frequency; determining a transmit frequency limit for which it holds that the signal level associated therewith is for the first time lower than the highest signal level by a predetermined and stored signal level ratio; determining the difference between the transmit frequency limit and the resonant frequency; generating the pair of values from the highest signal level and the aforementioned difference; and calculating the parameter as a function of the pair of values. An example of a suitable parameter for the signal quality is the ratio between the highest signal level and the aforementioned difference. This allows reliable detection of an error in a measurement cycle.

Another embodiment provides that when the parameter falls below the lower limit, the sensitivity of the receiver and/or the transmit power of the transmitter is/are increased for a further measurement cycle, or a visual or audible error message is issued to the user if the sensitivity of the receiver and/or the transmit power of the transmitter is/are set to their respective maximum values. Thus, a measurement cycle in which signal levels are too low is reliably prevented from being used for the further course of the program, in which the normal operation of the household appliance is influenced as a function of the measurement cycle.

Another embodiment provides that when the parameter exceeds the upper limit, the sensitivity of the receiver and/or the transmit power of the transmitter is/are reduced for a further measurement cycle, or a visual or audible error message is issued to the user if the sensitivity of the receiver and/or the transmit power of the transmitter is/are set to their respective minimum values. Thus, a measurement cycle in which signal levels are too high is reliably prevented from being used for the further course of the program, in which the normal operation of the household appliance is influenced as a function of the measurement cycle.

In a further embodiment, the measurement cycle is used for the normal operation of the household appliance if the parameter is within the range between the lower and upper limits. This ensures that the measurement cycle is of a quality sufficient to be used for the further course of the program, i.e., for the normal operation of the household appliance.

FIG. 1 shows a household appliance in the form of a baking oven. The baking oven has a control panel including control elements 2 and a display 4. A treatment chamber 6 in the form of a cooking chamber is located below the control panel. A household appliance controller 8 is located behind the control panel. A combined transmitting and receiving antenna 10 is electrically conductively connected to household appliance controller 8 and extends into the cooking chamber 6. Alternatively, it would also be possible to use separate transmitting and receiving antennas. Also provided in cooking chamber 6 is a cooking chamber heater 12. A food 16 placed on a food-supporting member 14 can be inserted into cooking chamber 6. Food 16 may be in the form of a piece of meat and is pierced with a cooking skewer 18 which is designed as a temperature measuring probe. A surface wave device 20 is incorporated in cooking skewer 18 and electrically conductively connected to a cooking skewer antenna 22. Electrical signals are wirelessly exchanged between combined transmitting and receiving antenna 10 and cooking skewer antenna 22 This is symbolized in FIGS. 1 and 2 by curved lines 28 and 30.

Figure 2:
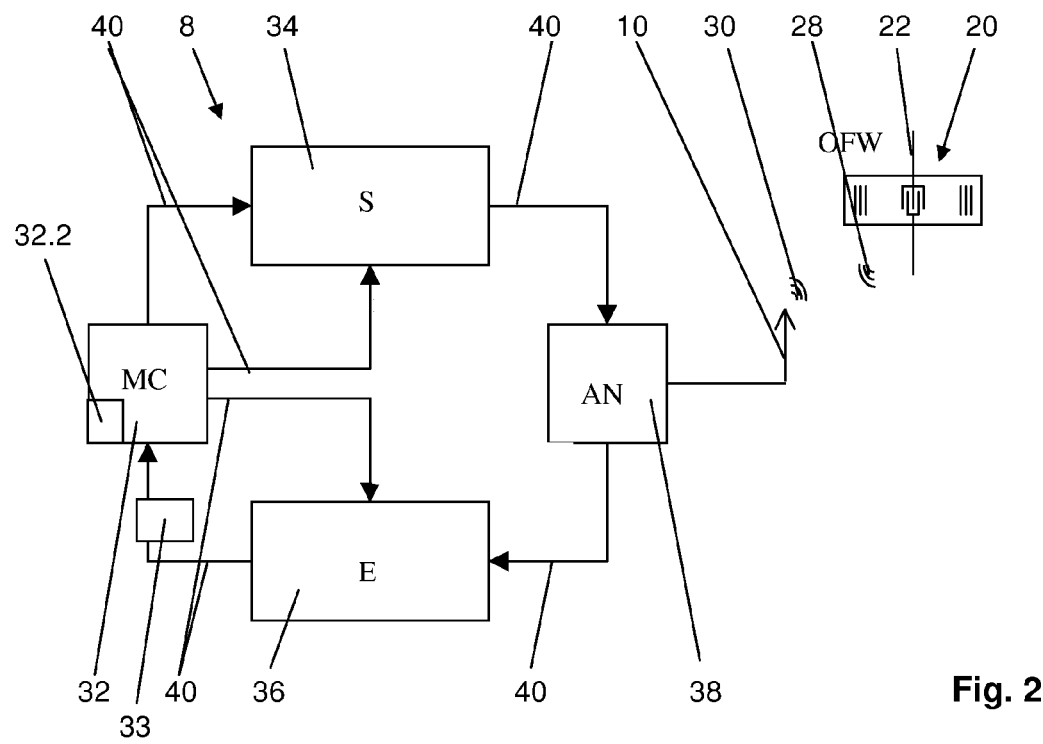
FIG. 2 is a view illustrating the basic design of a household appliance controller and a transmitter for implementing the method of the present invention.

FIG. 2 shows the basic design of household appliance controller 8 and cooking skewer antenna 22. Household appliance controller 8 has a central processing unit 32 including a memory 32.2, an evaluation circuit 33, and combined transmitting and receiving antenna 10. Furthermore, located between central processing unit 32 and combined transmitting and receiving antenna 10 are a transmitter 34 having an adjusting device for adjusting the transmit power, a receiver 36 having an adjusting device for adjusting the sensitivity, and an antenna-matching network 38. The interaction between the individual components of household appliance controller 8 is symbolized by arrows 40.

The method of the present invention will now be described in more detail with reference to FIG. 3 and FIGS. 4 through 6.

Figure 3:
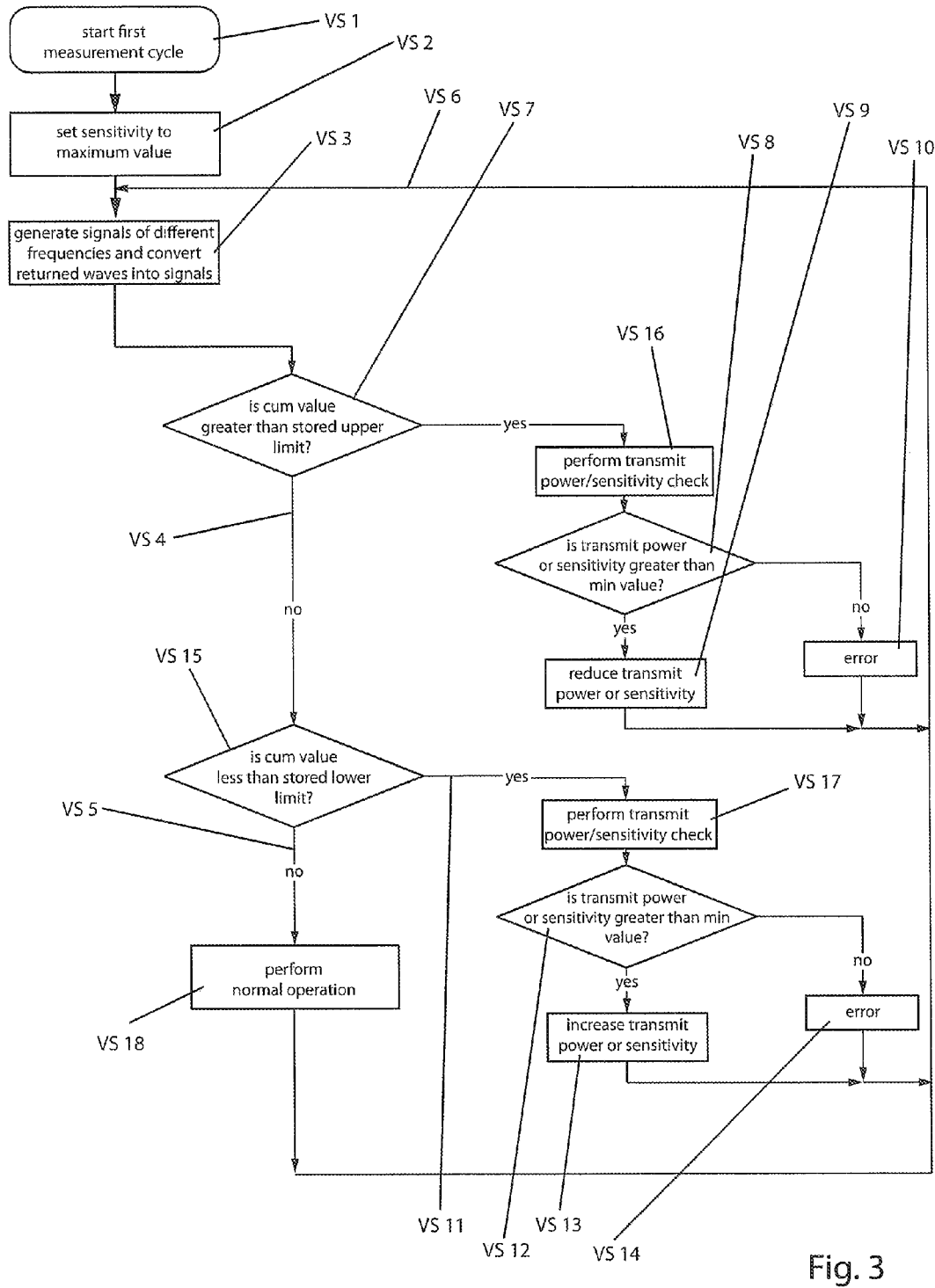
FIG. 3 is a flow chart of the method of the present invention.

The flow chart shown in FIG. 3 illustrates the individual steps of an exemplary embodiment of the method according to the present invention. Once the user has started the first measurement cycle (method step 1, abbreviated as VS 1), for example by turning on the household appliance, the overall sensitivity of household appliance controller 8 is automatically set to the maximum possible value; see also VS 2. This means that both the transmit power of transmitter 34 and the sensitivity of receiver 36 are initially set to their respective maximum possible values.

The measurement cycle is started, so that high-frequency electrical signals are generated in household appliance controller 8 and transmitted as electromagnetic waves via transmitting and receiving antenna 10 toward cooking skewer antenna 22. The electromagnetic waves returned from cooking skewer antenna 22 are received by transmitting and receiving antenna 10 and passed to evaluation circuit 33. In order to infer the food temperature from the received electrical signals, the system sweeps through a predetermined frequency band, for example, from 433 MHz to 434 MHz, each time a temperature measurement is made, i.e., each time a measurement cycle is performed. Electrical signals of different frequencies within the band of frequencies are successively generated in household appliance controller 8, for example in steps of 5 kHz, transmitted as electromagnetic waves to cooking skewer antenna 22, and the electromagnetic waves returned therefrom are in turn converted to electrical signals; see also VS 3. In this connection, the frequency band for the measurement cycles must be selected according to the particular application and such that in all possible operating conditions of the household appliance or the like, the resonant frequency, which depends on the physical quantity to be measured (in this case temperature), is within the frequency band selected for the measurement cycles.

The signal levels of the electrical signals returned to household appliance controller 8 and received by combined transmitting and receiving antenna 10 are measured, and, in the present exemplary embodiment, summed in evaluation circuit 33. The resulting parameter is a cumulative value and is compared in evaluation circuit 33 to limits previously defined and stored in memory 32.2 of central processing unit 32. These limits, namely a lower limit and an upper limit, depend strongly on the system as a whole, i.e., on the household appliance as a whole, so that the specific values differ strongly from household appliance to household appliance, and even within a class of household appliances, such as from one type of oven to another type of oven.

If the comparison shows that the cumulative value is greater than the lower limit and less than the upper limit, the measurement cycle is considered to be of a quality sufficient to be subsequently used for the normal operation (see V 18) of the household appliance; see also VS 4 and VS 5.

Figure 4:
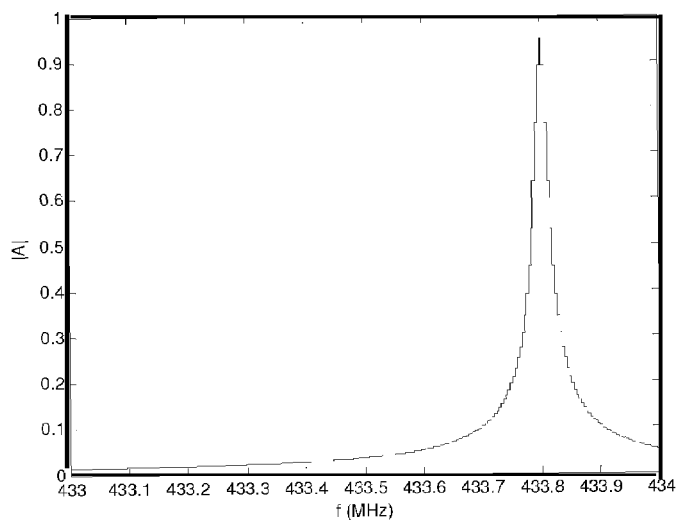
FIG. 4 is a first exemplary diagram showing the variation with time of the signal levels of a measurement cycle in which the parameter is within the range between the lower and upper limits.
Figure 5:
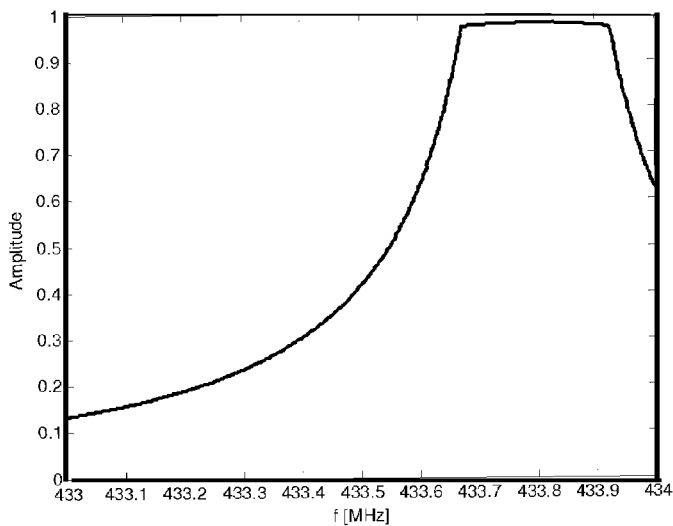
FIG. 5 is a second exemplary diagram showing the variation with time of the signal levels of a measurement cycle in which the parameter is above the upper limit.
Figure 6:
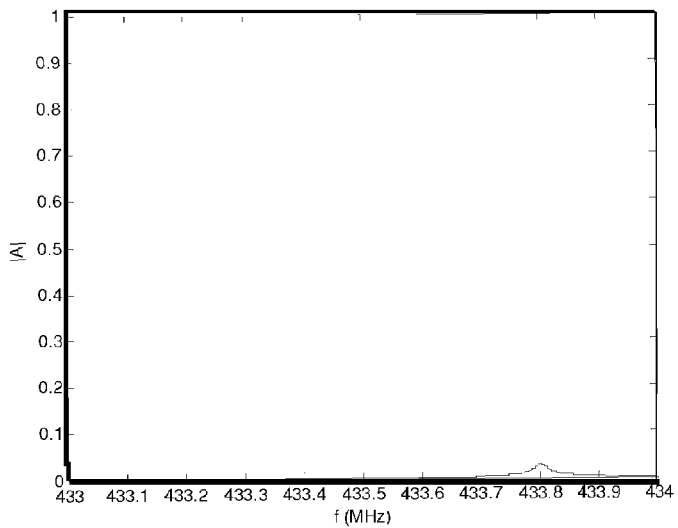
FIG. 6 is a third exemplary diagram showing the variation with time of the signal levels of a measurement cycle in which the parameter is below the lower limit.

FIG. 4 is an exemplary graph which shows the signal levels as a function of the transmit frequency and indicates sufficient quality.

The food temperature is then indirectly determined from the highest signal level of the available electrical signals and the transmit frequency associated therewith, which is the resonant frequency.

The measurement cycle can be used for the normal operation; the food temperature determined in this manner is used for the further course of the program, for example, to display the current temperature on display 4.

In general, the process of determining the current temperature is a continuous process which is carried out during the entire cooking process. Accordingly, a new measurement cycle is started using the already available settings for the transmit power and sensitivity; see also VS 6.

Alternatively, the measurement cycle can also be initiated in a different manner, for example, by an automatic program start.

In cases other than the exemplary case of FIG. 4, adverse coupling characteristics may result in that the combined transmitting and receiving antenna 10 receives a very weak electrical signal, or one that is too strong.

During each measurement cycle, the system first checks whether the current cumulative value is greater than the stored upper limit; see VS 7. In this regard, see also FIG. 5, which shows the variation of the signal levels as a function of the transmit frequency for a case where signal levels are too high. If the current cumulative value is indeed greater than the stored upper limit, a check is made (see V 16) as to whether the transmit power and the sensitivity are greater than the respective minimum values; see also VS 8. If at least either the transmit power or the sensitivity meets this criterion, the transmit power, the sensitivity, or both is/are reduced by a predetermined value, if possible; see also VS 9. Then, a new measurement cycle is started without requiring any user intervention; see VS 6.

In a different case, where none of the aforementioned reductions are possible, an error message will be output, for example, via display 4; see also VS 10.

If the above-mentioned comparison shows that the cumulative value is less than the upper limit (see also VS 4) the system checks whether the current cumulative value is less than the stored lower limit (see VS 15). If the cumulative value is found to be less than the lower limit (see also VS 11), the signal levels are determined to be too low. In this regard, see also FIG. 6, which shows the variation of the signal levels as a function of the transmit frequency for a case where signal levels are too low. If the signal levels are too low, a check is made (see VS 17) as to whether the transmit power and the sensitivity are less than the respective maximum values; see also VS 12. If at least either the transmit power or the sensitivity meets this criterion, the transmit power, the sensitivity, or both is/are increased by a predetermined value, if possible; see also VS 13. Then, a new measurement cycle is performed.

In a different case, where none of the aforementioned increases are possible, an error message will be output, for example, via display 4; see also VS 14.

As an alternative to the aforementioned exemplary embodiment, in place of using the cumulative value as the parameter, it is also possible to use a value which is calculated from the signal levels and the associated transmit frequencies as follows:

Initially, the highest signal level and the associated transmit frequency, i.e., the resonant frequency, are determined from the signal levels and the associated transmit frequencies of the current measurement cycle. Then, a transmit frequency limit is determined for which it holds that the signal level associated therewith is for the first time lower than the highest signal level by a predetermined and stored signal level ratio. Should the highest signal level occur at a transmit frequency at the edge of the frequency band used, i.e., should the resonant frequency in this case be either 433 MHz or 434 MHz, there is only one limit frequency. A pair of values is generated from the difference between the so-determined transmit frequency limit and the resonant frequency and the highest signal level. Then, the alternative parameter is calculated as a function of the pair of values. For example, it would be possible to use, as the parameter, the quotient of, the difference between the transmit frequency limit and the resonant frequency, and the highest signal level. It is also possible to use other measures. However, the more usual case is that the resonant frequency is between the two limits of the frequency band, because, as explained above, the frequency band is selected such that in all possible operating conditions of the household appliance, the resonant frequency, which depends on the physical quantity to be measured (in this case temperature), is within the frequency band selected for the measurement cycles. Then, there are two transmit frequency limits for which the aforementioned criterion is met.

In the case that there are two transmit frequency limits for which the above-mentioned criterion is met, it is useful for the two differences between the respective transmit frequency limits and the resonant frequency to be previously summed and then divided by two to obtain an average difference.

The method of the present invention is not limited to the exemplary embodiments described herein. It could also be used, for example, in other household appliances where electrical signals are transmitted wirelessly. In addition, it is conceivable that the cooking skewer antenna, or a similar component, of another household appliance could be an active element, so that the household appliance controller would not have to have a transmitter or transmitting antenna, but only a receiving antenna. The method of the present invention is also not limited to the measurement of a temperature, such as the temperature of a food load. Rather, the method is also applicable to the measurement of other physical quantities, such as pressure.

As already explained above, the frequency band for the measurement cycles are selected according to the particular application and such that in all possible operating conditions of the household appliance, the resonant frequency, which depends on the physical quantity to be measured (in this case temperature), is within the frequency band selected for the measurement cycles. If the frequency band is selected wide enough to reliably ensure that the resonant frequency is always within the frequency band and not at the edge thereof, then, as an alternative to the aforementioned evaluation method, an alternative parameter can be obtained using a method in which a pair of values is generated from the difference between the determined transmit frequency limits (left and right of the resonant frequency) and the greatest signal level. Then, the alternative parameter is calculated as a function of the pair of values. For example, it would be possible to use, as the parameter, the quotient of the difference and the highest signal level. It is also possible to use other measures.

What is claimed is:

1. A method of detecting an error in a measurement cycle comprising:
   wirelessly transmitting a sequence of electrical signals, sweeping through a predetermined frequency band, from a transmitter to a receiver of an electric evaluation circuit of a house hold appliance controller;
   measuring levels of the signals;
   calculating a parameter from the signal levels in the evaluation circuit, including:
      determining a highest signal level at a resonant frequency;
      determining a transmit frequency limit corresponding to a signal level that is lower than the highest signal level by a predetermined and stored signal level ratio;
      determining a difference between the transmit frequency limit and the resonant frequency:
      generating a pair of values from the highest signal level and said difference; and
      calculating the parameter from the pair of values;
   comparing the parameter to an upper and a lower limit; and
   determining the quality of the measurement cycle as a function of the comparison.

2. The method as recited in claim 1 wherein the parameter is an integrated or cumulative value of the signal levels.

3. The method as recited in claim 1 further comprising, if the parameter is within a range between the lower and upper limits, using the measurement cycle for a normal operation of the household appliance.

4. The method recited in claim 1 wherein, if the parameter is below the lower limit, further comprising:
   increasing at least one of the sensitivity of the receiver and the transmit power of the transmitter in a subsequent measurement cycle, or
   issuing a visual or audible error message to a user.

5. The method as recited in claim 4 wherein the error message is issued if at least one of the sensitivity of the receiver and the transmit power of the transmitter is at a respective maximum.

6. The method recited in claim 5 wherein, if the parameter is above the upper limit, further comprising:
   decreasing at least one of the sensitivity of the receiver and the transmit power of the transmitter in a subsequent measurement cycle, or
   issuing another error message to the user.

7. The method as recited in claim 6 wherein the other error message is issued if at least one of the sensitivity of the receiver and the transmit power of the transmitter is at a respective maximum.

8. The method as recited in claim 7 further comprising, if the parameter is within a range between the lower and upper limits, using the measurement cycle for a normal operation of the household appliance.

9. The method as recited in claim 8, wherein the parameter is an integrated or cumulative value of the signal levels.

10. The method recited in claim 1 wherein, if the parameter is above the upper limit, further comprising:
    decreasing at least one of the sensitivity of the receiver and the transmit power of the transmitter in a subsequent measurement cycle, or
    issuing an error message to a user.

11. The method as recited in claim 10 wherein the error message is issued if at least one of the sensitivity of the receiver and the transmit power of the transmitter is at a respective maximum.

12. The method as recited in claim 1 further comprising, if the parameter is within a range between the lower and upper limits, using the measurement cycle for a normal operation of the household appliance.

13. A method of detecting an error in a measurement cycle comprising:
    wirelessly transmitting a sequence of electrical signals, sweeping through a predetermined frequency band, from a transmitter to a receiver of an electric evaluation circuit of a house hold appliance controller;
    measuring levels of the signals;
    calculating a parameter from the signal levels in the evaluation circuit;
    comparing the parameter to an upper and a lower limit; and
    determining the quality of the measurement cycle as a function of the comparison,
    wherein, if the parameter is below the lower limit, further comprising:
    increasing at least one of the sensitivity of the receiver and the transmit power of the transmitter in a subsequent measurement cycle, or
    issuing a visual or audible error message to a user.

14. The method as recited in claim 13 wherein the error message is issued if at least one of the sensitivity of the receiver and the transmit power of the transmitter is at a respective maximum.

15. The method recited in claim 14 wherein, if the parameter is above the upper limit, further comprising:
    decreasing at least one of the sensitivity of the receiver and the transmit power of the transmitter in a subsequent measurement cycle, or
    issuing another error message to the user.

16. The method as recited in claim 15 wherein the other error message is issued if at least one of the sensitivity of the receiver and the transmit power of the transmitter is at a respective maximum.

17. The method as recited in claim 16 further comprising, if the parameter is within a range between the lower and upper limits, using the measurement cycle for a normal operation of the household appliance.

18. A method of detecting an error in a measurement cycle comprising:
    wirelessly transmitting a sequence of electrical signals, sweeping through a predetermined frequency band, from a transmitter to a receiver of an electric evaluation circuit of a house hold appliance controller;
    measuring levels of the signals;
    calculating a parameter from the signal levels in the evaluation circuit;
    comparing the parameter to an upper and a lower limit; and
    determining the quality of the measurement cycle as a function of the comparison,
    wherein, if the parameter is above the upper limit further comprising:
    decreasing at least one of the sensitivity of the receiver and the transmit power of the transmitter in a subsequent measurement cycle, or
    issuing an error message to a user.

19. The method as recited in claim 18 wherein the error message is issued if at least one of the sensitivity of the receiver and the transmit power of the transmitter is at a respective maximum.

* * * * *